US012572530B1

(12) United States Patent
Sorokoumov et al.

(10) Patent No.: US 12,572,530 B1
(45) Date of Patent: Mar. 10, 2026

(54) SYSTEM FOR TRANSFORMING DATA INTO TABLE FORMAT

(71) Applicant: Confluent, Inc., Mountain View, CA (US)

(72) Inventors: Alexander Sorokoumov, Mountain View, CA (US); John Roesler, Austin, TX (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 18/990,055

(22) Filed: Dec. 20, 2024

(51) Int. Cl.
*G06F 16/23* (2019.01)
*G06F 16/215* (2019.01)
*G06F 16/22* (2019.01)

(52) U.S. Cl.
CPC ........ *G06F 16/2379* (2019.01); *G06F 16/215* (2019.01); *G06F 16/2282* (2019.01); *G06F 16/2393* (2019.01)

(58) Field of Classification Search
CPC .............. G06F 16/2379; G06F 16/215; G06F 16/2282; G06F 16/2393
See application file for complete search history.

(56) References Cited

U.S. PATENT DOCUMENTS 10,331,657 B1 * 6/2019 Cole ..................... G06F 16/901
11,100,111 B1 * 8/2021 Akidau ............... G06F 16/2456

12,050,582 B1 * 7/2024 Aya .................... G06F 16/24573
2017/0063965 A1 * 3/2017 Grenader ............ H04L 67/1095
2018/0032582 A1 * 2/2018 Lukkoor ................. G06F 7/08
2019/0384835 A1 * 12/2019 Luo ...................... G06F 16/1865
2020/0097373 A1 * 3/2020 Zhao .................. G06F 11/1471
2022/0188297 A1 * 6/2022 Cseri .................. G06F 16/2308

* cited by examiner

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

Systems and methods are directed to transforming data into a distributed table format. The system accesses new data for a topic. One or more materializers generate data files from the new data, whereby each of the materializers can process a specific range of offsets within a partition of the topic. The materializers also generate materializer committables corresponding to the data files. A maintainer performs one or more maintenance operations on previously committed files and generates a maintainer committable for each maintenance operation performed. The maintenance operations can include merging previously committed smaller files into a larger file and deleting obsolete files. Subsequently, a committer scheduler schedules the maintainer and materializer committables for a commit process. Scheduling includes prioritizing which committables are applied first and ordering materializer committables based on their offsets. The commit process is performed based on the scheduling resulting in a single snapshot of the table.

20 Claims, 7 Drawing Sheets

SYSTEM FOR TRANSFORMING DATA INTO TABLE FORMAT

TECHNICAL FIELD

The subject matter disclosed herein generally relates to real-time data streaming in distributed computing environments. Specifically, the present disclosure addresses systems and methods that transforms the real-time data streams into a distributed table format without conflicts or retries.

BACKGROUND

Cloud-computing systems have grown in popularity as a method of providing computer implemented resources. A service provider can provide services to various end-users based on the needs of the various end-users. These services can include streaming real-time data from and to users using various streaming protocols. An example of a streaming protocol that can be used is the Apache™ Kafka™ streaming platform.

In some cases, the real-time data needs to be rewritten into a read optimized format. One way of doing this is using an open-source table format such as Apache Iceberg™. In Iceberg™, the process of writing consists of two parts: 1) write actual data files, and 2) commit the data files, whereby the commit process makes the data files accessible. Iceberg™ maintains a linear history of snapshots of which files are changed (e.g., a file was added, a file was replaced by another file). The commit process is responsible for incorporating changes into this total history of all the snapshots.

Unfortunately, a downside of the Iceberg™ approach is that there may be conflicts. For example, if there is a maintenance job running that rewrites or replaces a committed file and there is an ongoing process that is updating a record in the same file that has been replaced, there is a conflict and only one of the two operations can win. As such, Iceberg™ performs the write for both operations but, at commit time, one of the operations will be rejected. In particular, Iceberg™ commits new snapshots by doing Compare-And-Set (CAS) in a catalog. If CAS fails, it runs a conflict check. If a conflict check succeeds (e.g., there are no conflicts), Iceberg™ will attempt to use a newer snapshot as a base and try to CAS again. If the conflict check fails, the commit is aborted. Even with the conflict check, Iceberg's write path limits concurrency. For example, updates to existing rows will conflict with compactions causing at least one concurrent operation to retry.

BRIEF DESCRIPTION OF THE DRAWINGS

Various ones of the appended drawings merely illustrate example examples of the present disclosure and should not be considered as limiting its scope.

DETAILED DESCRIPTION

Figure 1:
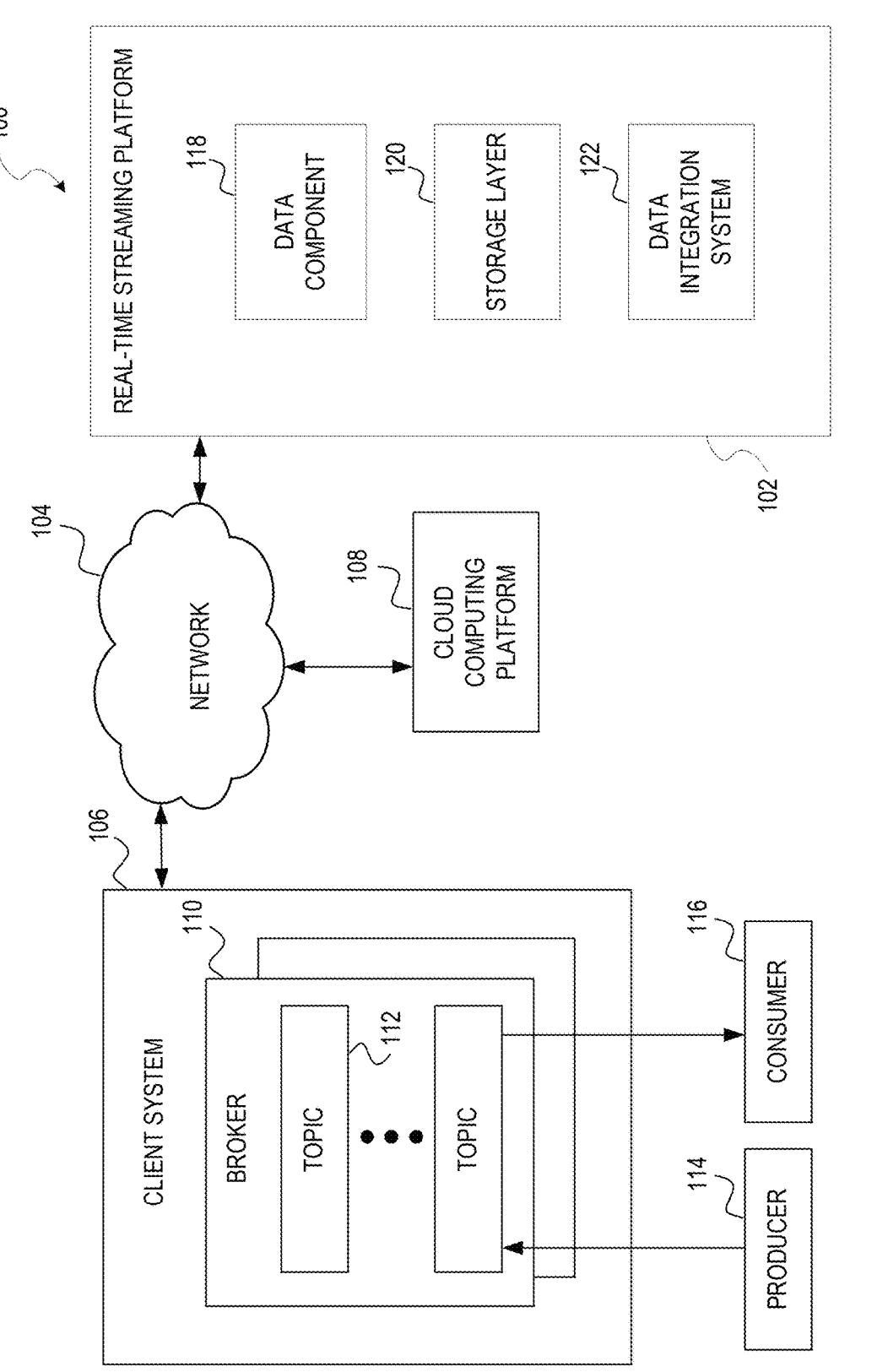
FIG. 1 is a diagram illustrating an example network environment suitable for transforming data into a distributed table format, according to example embodiments.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

With most distributed or open-source table formats, such as Apache Iceberg™, new writes come from independent, uncoordinated writers. These table formats' write path orders incoming writes so that they form a linear, consistent history. However, conflicts can occur if the incoming writes are out of order or if changes have been made to previously committed files. For ease of discussion, the following description will use Apache Iceberg™ as a representative distributed table format. However, it is noted that other types of distributed table format can be used.

Example embodiments comprise a distributed, real-time streaming platform that address these issues by prioritizing and reordering committables before committing them. In various examples, the distributed streaming platform comprise Apache Kafka™ or Confluent™ and the data integration system comprises Confluent Tableflow™. The committables are metadata objects that contain information about new or modified data files associated with a topic. The committables represent the changes that need to be committed to, for example, the Iceberg™ catalog to make the new data files accessible and to update the table's state. In some embodiments, the reordering is based on offsets (e.g., positions) of the records in a partition of the topic.

The prioritizing of committables can be based on rules and/or heuristics. For example, the prioritizing can be based on data freshness properties, which determines which topics take priority over others based on how soon published messages should appear in a snapshot (representing a state of a table at a specific point in time). In a further example, committables from a maintainer that involve merging small files into larger ones or deleting obsolete files are prioritized over committables from materializers that involve the new data. By processing the maintainer committables first, the system can reduce the number of files and work that is needed for updates, minimizing commit overhead and improving efficiency.

As a result, example embodiments provide a technical solution to the technical problem of transforming real-time streaming data into a distributed table format without conflicts or retries. In particular, the technical solution splits the write path into two services—a writer and a committer. The writer processes incoming records, produces data files (e.g., Apache Parquet™ files), and generates committables (e.g., information about the data files). The system prioritizes and orders the committables to reduce commit overhead. In some cases, pre-commit merge may be performed to merge multiple materializer committables into a larger commit-table, which reduces the number of files and further improves efficiency.

FIG. 1 is a diagram illustrating an example network environment 100 suitable for transforming data into a distributed table format, according to example embodiments. A real-time streaming platform 102 provides cloud-based functionality via a communication network 104 (e.g., the Internet, wireless network, cellular network, or a Wide Area Network (WAN)) to a client system 106. The real-time streaming platform 102 is configured to manage real-time data streaming and seamless integration and data transfer between the client system 106 and cloud storage (e.g., cloud computing platform 108). In one example, the real-time streaming platform 102 comprises Confluent Cloud™. The cloud storage can be in the client system's virtual private cloud.

In various cases, the client system 106 is a system associated with a client or customer of the real-time streaming platform 102. The client system 106 comprises a plurality of client devices and storage devices. For example, the client devices may comprise, but is not limited to, a smartphone, a tablet, a laptop, multi-processor systems, microprocessor-based or programmable consumer electronics, a desktop computer, a server, or any other communication device that can access the network system 102. The client device 106 can include an application that exchanges data, via the network 104, with the real-time streaming platform 102. For example, the application can be a local version of an application associated with the real-time streaming platform 102 that can provide data to and access data from one or more components at the real-time streaming platform 102.

In example embodiments, the client system 106 interfaces with the real-time streaming platform system 102 via a connection with the network 104. Depending on the form of the client devices of the client system 106, any of a variety of types of connections and networks 104 may be used. For example, the connection may be Code Division Multiple Access (CDMA) connection, a Global System for Mobile communications (GSM) connection, or another type of cellular connection. In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The cloud computing platform 108 can be a third-party cloud service provider that, among other functions, provides cloud storage. The cloud storage can include, for example, data warehousing and data lakes. The cloud computing platform 108 can also provide an analytics engine for analysis of the stored data. Examples of cloud computing platforms include Amazon AWS, Microsoft Azure, and Google Cloud Platform.

In example embodiments, the client system 106 comprise one or more brokers 110. In some cases, the brokers 110 are a network of machines (e.g., servers). In other cases, the brokers 110 are containers running on virtualized servers on processors in a datacenter, or a combination of the machines and containers.

The brokers 110 are configured to run a broker process in order to handle requests from clients and keep data replicated. Specifically, each broker 110 can host a plurality of partitions associated with each topic 112, handle incoming requests to write new events (e.g., a fact that happened) to those partitions, read events from the partitions, and/or handle replication of partitions. Each topic is a unit of organization that groups similar records/data together (e.g., by category). Thus, each topic 112 acts as container to hold similar events. The partition is the smallest storage unit holding a subset of records or data for a particular topic 112.

Each broker 110 has a network server that accepts connections on one or more listeners and allocates each connection to a processor from its pool of processors. A selector associated with the assigned processor handles all traffic on the connection using non-blocking input/output. The state of each connection is stored in a channel managed by the selector.

Clients (e.g., producer 114, consumer 116) connect to the brokers 110 on one of the advertised listeners. The clients are configured with security configurations to authenticate with the broker 110 for the security protocol used by the listener. A network client used by the client has its own selector that establishes connections and processes traffic to/from the brokers 110. A state of each connection is stored in a channel managed by the selector of the network client.

For a typical flow (e.g., to obtain metadata), the client establishes a connection to the broker 110 and initiates authentication flow. If authentication fails, the connection is terminated by the broker 110. Otherwise, the channel moves to a ready state and the broker 110 starts processing requests arriving on the channel. On each channel, the client sends requests and the broker 110 processes a request, sends a response to the request, and then reads the next request.

The producer 114 is configured to produce new data and send the new data (e.g., new records) to the broker 110. In some embodiments, the producer 114 comprises a client application that is a source (e.g., publishes, streams) of the events. In some embodiments, the producer 114 streams or publishes the new data to the broker 110 in real-time. Thus, the client system 106 receives the new data from the producer 114 and stores the new data into partitions in the respective topics 112.

A consumer 116 is configured to consume data (e.g., batches of records) from one or more topics 112 of the broker 110. More particularly, the consumer 116 is an end-user or application that retrieves data from the client system 106 (or the cloud computing platform 108). In some embodiments, the consumer 116 subscribes to respective topics 112 in order to read and process data from the respective topics 112.

Turning specifically to the real-time streaming platform 102, the real-time streaming platform 102 comprises a data component 118, a storage layer 120, and a data integration system 122. The real-time streaming platform 102 can comprise other components that are not germane to discussion of example embodiments.

The new data stored in the partitions of the topics 112 at the client system 106 needs to be stored to the cloud (e.g., the cloud computing platform 108). As such, the data component 110 of the real-time streaming platform 102 accesses the data in the topics 112 in substantially real-time. In example embodiments, the data component 118 comprises interfaces or connectors that can be used to transfer data between systems (e.g., the client system 106 to the real-time streaming platform 102; the real-time streaming platform 102 to the cloud computing platform 108). The connectors can include, for example, a source connector (e.g., for ingesting data into a topic) and a sink connector (e.g., for pushing data from the topic to an external system).

In example embodiments, the data component 118 serves as a streaming layer to the storage layer 120. The storage layer 120 comprises topics which, conceptually, are unbounded sequences of serialized events, where each event is represented as an encoded key-value pair or message. Messages are sent to and read from specific topics. In example embodiments, the topics are partitioned and replicated across brokers throughout the implementation. Thus, the partitions and topics in the storage layer 120 can mirror the partitions and topics 112 in the client system 106. Using partitions and topics ensure seamless communication and allows for parallel execution and elasticity of the execution of tasks.

The data integration system 122 is configured to transform the data in the partitions into a distributed table format. In one embodiment, the data integration system 122 comprises Confluent Tableflow™ and transforms the data into Iceberg™ table format. Thus, the data integration system 122 reads records from the topics and writes then into a distribute table format. There are two key observations with using topics. First, there is always a single source of new data in the system—the source topic. Secondly, records in each topic are ordered and assigned positions (e.g., offsets). Thus, all the write work can be performed in parallel, same as in Iceberg™, however, at commit time, the events can be reordered based, for example, on the offsets. As such, example embodiments will not experience any conflicts between new incoming records since they are ordered ahead of time. Because there are no conflicts, there is no need for conflict checks and retries. Advantageously, this results in a more efficient system. The data integration system 122 will be discussed in more detail in connection with FIG. 2 to FIG. 4 below.

Any of the systems, platforms, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one component may, in alternative examples, be embodied in a different component. Additionally, any number of client systems 106 and cloud computing platforms 108 may be embodied within the network environment 100. While only a single real-time streaming platform 102 is shown, alternatively, more than one real-time streaming platform 102 can be included (e.g., localized to a particular region).

Figure 2:
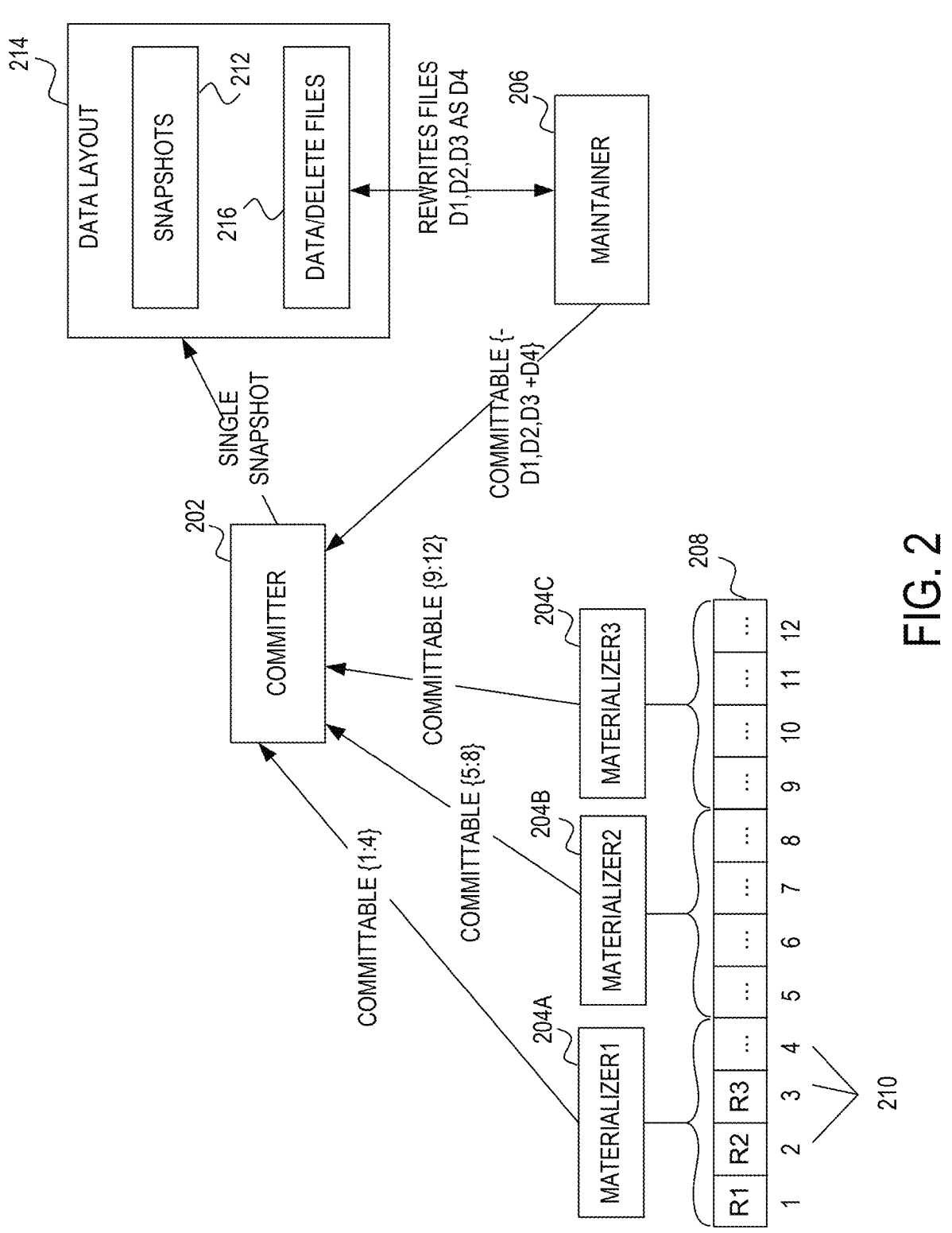
FIG. 2 is a diagram illustrating data flow between components associated with the data integration system, according to example embodiments.

FIG. 2 is a diagram illustrating data flow between components associated with the data integration system 122, according to example embodiments. In example embodiments, the data integration system 122 reads the real-time data accessed from the topic, processes and transforms it into a distributed table format, and writes the transformed data to the cloud storage platform 108. This process ensures that real-time data is efficiently and accurately converted into a format suitable for analytical workloads and long-term storage at the cloud computing platform 108. For ease of discussion, the operations of the data integration system 122 will be discussed with the topic being associated with Apache Kafka and the distributed table format being Apache Iceberg™.

In example embodiments, the write path is split into two services-a writer and a committer 202. The writer processes incoming records, generates data and auxiliary files, uploads the files to persistent storage at the cloud computing platform 108, and sends a committable to the committer 202. Examples of auxiliary files include a deletion vector, a position delete file, or an equality delete files. As an example, the data files can be Apache Parquet™ files.

Example embodiments include two different types of writers: a materializer 204 and a maintainer 206. The materializer 204 reads records from partitions 208 in a topic and rewrites the data into data files (e.g., Parquet™ files) that are Iceberg™ table data file. Parquet™ files are columnar storage files that contain the actual data. Each Parquet™ file stores a subset of the Iceberg™ table's records.

The data integration system 122 can comprises a plurality of materializers (e.g., 204A, 204B, 204C) and each materializer 204 reads a set of records from the partition 208 in the topic, whereby the records are designated by offsets 210. The offsets 210 represent a position of a message or record in a Kafka log in a Kafka partition and provides an indication in which order the messages should be read relative to each other. The offsets 210 provide a global order of messages, which allows for a single commit for events from multiple materializers 204. As such, the materializers 204 can prepare their work ahead of time (and in parallel) and it is guaranteed that it can all be composed together into a large, single snapshot 212 in a data layout 214. While only a single partition 208 is shown in FIG. 2, any number of partitions can make up the topic.

The data layout 214 is a structured organization of data files and metadata that make up a table (e.g., Iceberg™ table). The data layout 214 ensures that data is stored efficiently, can be accessed quickly, and maintains consistency and integrity across the system. The data layout 214 includes the data files 216 such as, for example, the Parquet™ files that contain the actual data. The data layout 214 can also include metadata files, such as, manifest files that lists data files that are a part of a particular snapshot 212 of the table and manifest list files that represents a snapshot 212 of the table at a specific point in time. The metadata files can also include the snapshot files (or snapshots 212) that represent the state of the table at a specific point in time. Finally, the data layout 214 can include auxiliary files including delete files 216 that contain information about rows that have been logically deleted from the table (but physically still in the data files) and schema files that define the schema of the table.

It is noted that work can be performed in parallel on different sets of offsets (or offset ranges) of the topic. For example, materializer1 204A is a job that works on offsets 210 from 1-4 and materializer2 204B is a job that works on offsets 5-8, and so on. These jobs produce data files as the result and also a committable which is a small piece of metadata describing, for its specific offset range, what is in the data file and what is happening. Specifically, in FIG. 2, a first materializer1 204A reads a first set of records from the partition 208 that comprises record 1 (R1) through record 4 (R4). The first set of records are associated with offsets 1, 2, 3, 4. The first materializer 204A generates a committable (e.g., committable {1:4}) for record 1 (R1) through record 4 (R4). Similarly, a second materializer2 204B reads a second set of records from the partition 208. The second set of records are associated with offsets 5, 6, 7, 8. The second materializer 204B generates a second committable (e.g., committable {5:8}) for the second set of records. This continues for a third materializer1 204C, which reads a third set of records from the partition 208. The third set of records are associated with offsets 9, 10, 11, 12. The third materializer 204C generates a committable (e.g., committable {9:12}) for this set of records. It is noted that any number of materializers 204 can be generating committables.

The maintainer 206 is configured to improve the efficiency of the commit process by performing maintenance tasks such as compaction or removing obsolete files. The maintainer 206 can also prune metadata by deleting snapshots that are no longer needed. Compaction involves merging smaller data files into one or more larger files. As new data is ingested and written into the table, having many small files can lead to inefficiencies in storage and querying. Compaction merges these small files into a larger one, reducing the number of files, and improving read performance. For example, the maintainer 206 can rewrite three small data files D1, D2, and D3 as a single, larger data file D4 by merging them together and generating a maintainer committable that contains information indicating that these three files have been merged into a single larger file and that the original files should be marked for deletion (e.g., committable {-D1, D2, D3 +D4}).

With respect to removing obsolete files, the maintainer 206 can identify and remove data files that are no longer needed (e.g., have been logically deleted, replaced by new versions). When data is logically deleted, the maintainer 206 creates delete files 216 that mark the rows as deleted without physically removing the files. This allows for efficient handling of deletions while maintaining the ability to recover data if needed.

In example embodiments, the maintainer 206 periodically accesses the storage layer (e.g., the data layout 214) to identify small or obsolete data files that need to be compacted or deleted. The maintainer 206 then merges the small data files or deletes the obsolete files and generates maintainer committables that contain information about the changes made during the compaction or deletion process. These maintainer committables include references to the new, larger data file created by merging smaller ones and/or information about files that have been deleted or replaced.

The committer 202 is a singleton service that accepts the materializer committables and maintainer committables, orders these committables, writes auxiliary files, and then updates the catalog (e.g., Iceberg™ catalog). In example embodiments, the committer 202 orders the committables based on an ordering mechanism. In Kafka embodiments, the ordering can be based on topic-partition offset order. Since records in a Kafka topic are totally ordered and assigned positions, the committer 202 can use this information to ensure that the committables are processed in the correct order. That is, the committer 202 orders the committables based on their offsets 210 to maintain the correct sequence of events. This ensures that the data is integrated into the table in the same order it was produced. However, in alternative embodiments, the ordering can be based on a different ordering mechanism such as timestamps or a logical clock.

In example embodiments, the committer 202 prioritizes maintainer committables over materializer committables. Maintainer committables can involve merging smaller files into a larger one and/or deleting obsolete files. By processing these maintainer committables first, the committer 202 can reduce the number of files that need to be updated, resulting in minimizing the commit overhead.

Once maintainer committables are processed, the committer 202 then processes the materializer committables in the correct order. When processing the materializer committables, the committer 202 ensures that there are no gaps in the offsets. For example, if the last committed snapshot corresponds to a topic partition offset of 10, the first materializer committable must start from offset 11. Thus, the committer 202 checks for gaps and ensures that the materializer committables cover a contiguous range of offsets. Continuing with the example, the committer 202 will first remove the deleted files (D1, D2, D3) and adds the merged file (D4) based on the maintainer committable. Then the committer 202 applies new offsets based on the materializer committables (e.g., committable {1:4}, committable {5:8}, committable {9:12}). The committer 202 commits all of these committables in a single commit—single snapshot—to the distributed table format (e.g., Iceberg™).

By using a single committer 202 in the data integration system 122, the data integration system 122 is guaranteed to run conflict-free. Furthermore, the data integration system 122 can run as many concurrent writers as desired.

Figure 3:
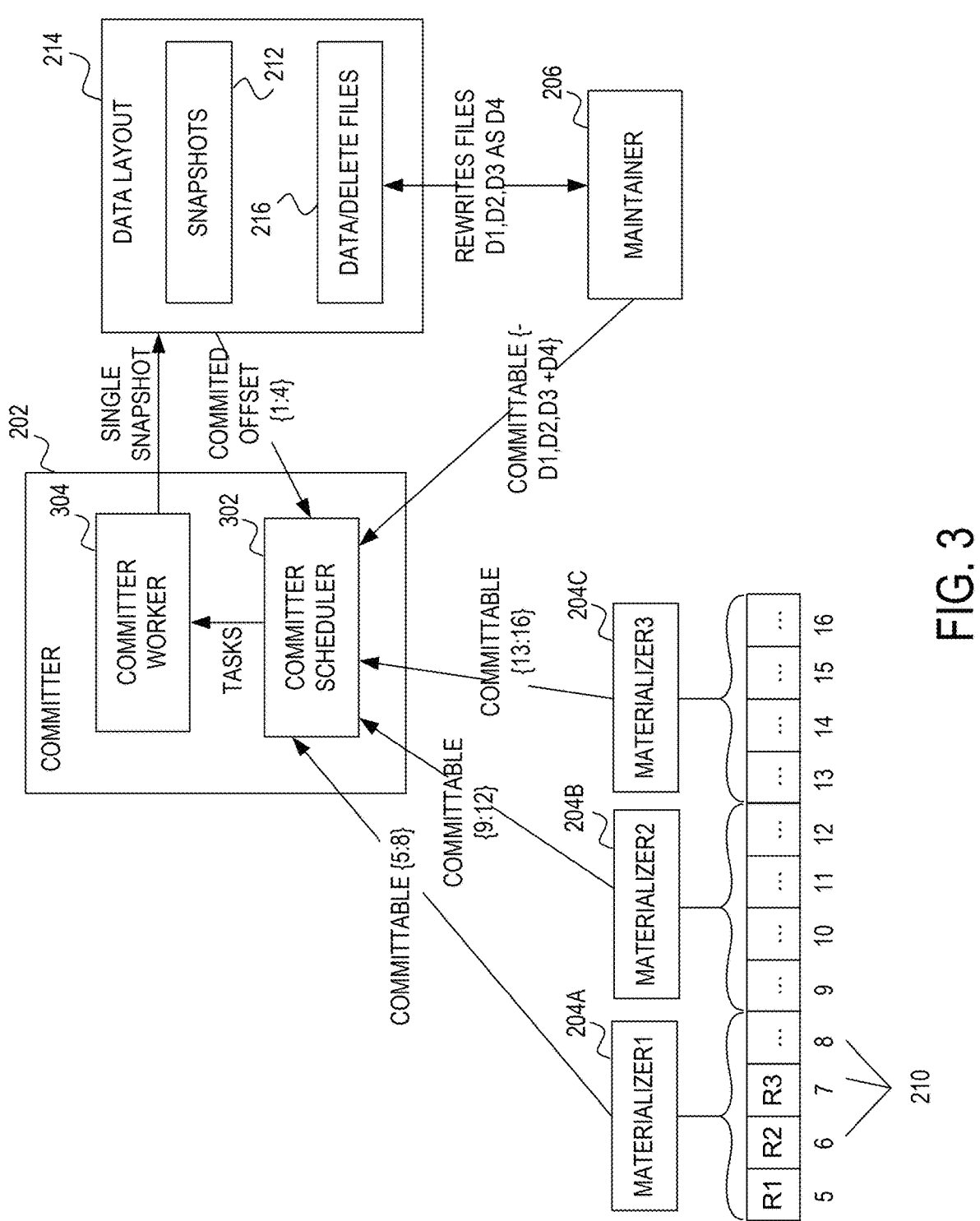
FIG. 3 is a diagram illustrating data flow between components associated with the data integration system having a committer scheduler and a committer worker, according to example embodiments.

FIG. 3 is a diagram illustrating data flow between components associated with the data integration system 122 having a committer scheduler 302 and committer worker 304, according to example embodiments. In the embodiment shown in FIG. 3, the committer 202 comprises the committer scheduler 302 and the committer worker 304. In example embodiments, the committer scheduler 302 receives all committables it must commit and schedules a committer task based on various rules. The committer task can comprise one or more committables. One rule is that there can only be one running committer task for a given topic.

A second rule is that the materializer committables cannot have gaps in offsets from the last committed snapshot. As such, the committer scheduler 302 waits for a one or more contiguous materializer committable to accumulate that advances from a current materializer offset. For example, if the last committed snapshot corresponds to a topic partition offset of 4 (committed offset {1:4}), then the first materializer committable must start from offset 5.

In example embodiments, the committer scheduler 302 processes a subset of topics in a given cloud region. As such, the committer scheduler 302 can prioritize which tables/topics or even which committables to apply first based on heuristics. In example embodiments, the heuristics is based on a level of the work that needs to be done. For example, the tables/topics can have a target freshness property that indicate how soon published messages should appear in the snapshot. This target freshness property is configurable by a client/customer and is typically desired to be on the lower side (e.g., with a few minutes). The committer scheduler 302 can prioritize commits to topics with exceeded (or soon to be exceeded) target freshness.

For example, assume there is a first table that has one materializer committable available, but it is ten minutes away from its desired freshness. Meanwhile, there is a second table that is only a few seconds away from its desired freshness. In this example, the second table will get priority.

In a further example, assume there is a first table and a second table that are both two minutes away from their desired freshness. Now, other factors can come into play to determine which gets priority. For instance, if the first table has a bunch of compactions that, if compacted sooner rather than later, will result in the queries becoming more efficient on the table while the second table only has a few materializer committables, then the first table gets priority.

In another example, maintainer committables do not require any pre-processing and reduces the amount of work to commit future materializer committables. As such, the committer scheduler 302 can prioritize topics with only maintainer committables or decide to commit only maintainer committables and delay materializer committables for a given topic. In some cases, the maintainer committables can be scheduled as soon as they are ready and there are no maintainer committables currently running.

Once scheduled, the committer scheduler 302 sends the committer tasks to the committer worker 304. Upon receipt, the committer worker 304 can fetch the latest state of the table. The committer worker 304 then applies the changes creating a single snapshot. In example embodiments, the committer worker 304 follows the schedule generated by the committer scheduler 302 (e.g., applying maintainer committables first to reduce the number of files). In some cases, the committer worker 304 also creates delete files, if needed, for previously committed data files.

Figure 4:
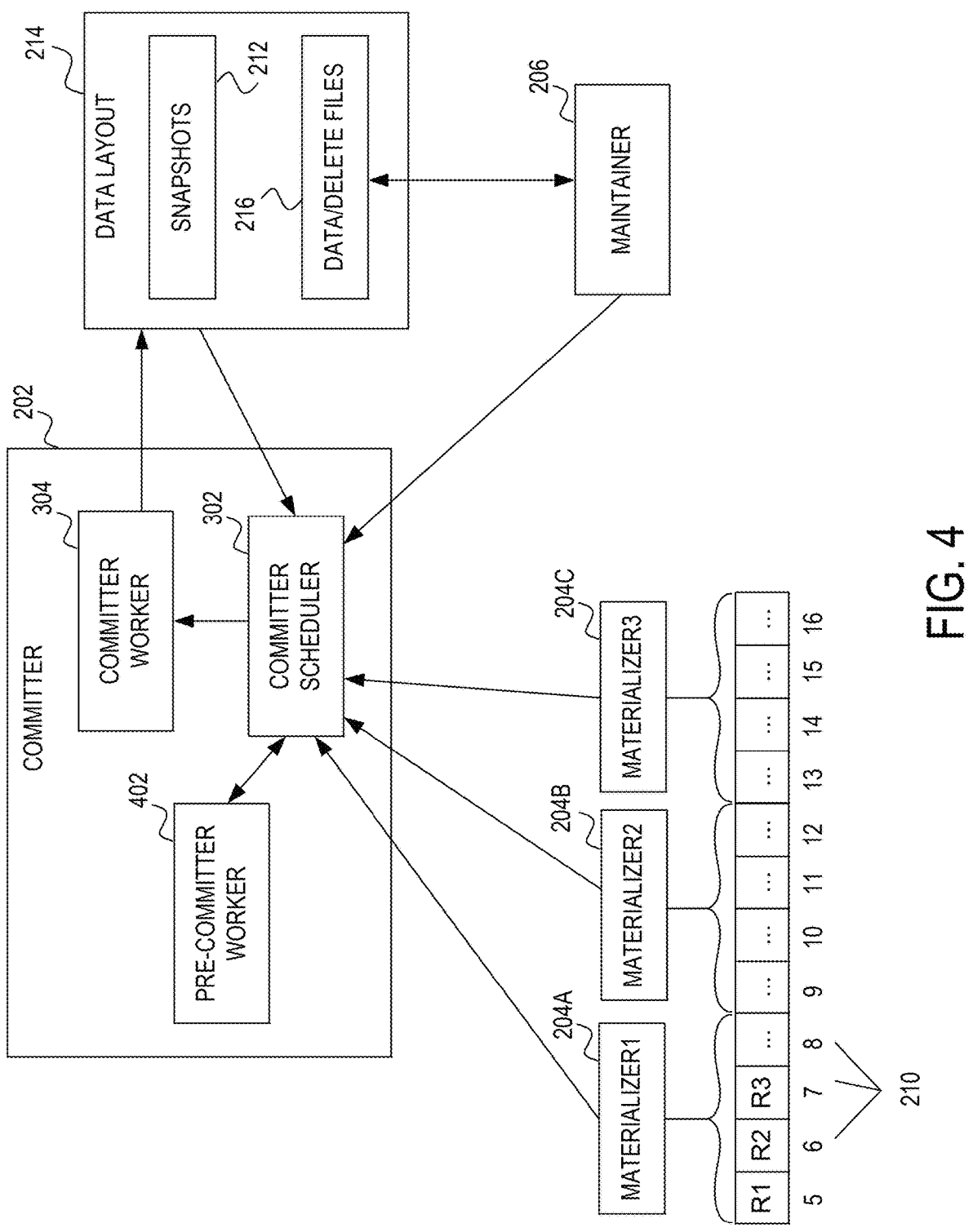
FIG. 4 is a diagram illustrating data flow between components associated with the data integration system having a pre-committer worker, according to example embodiments.

FIG. 4 is a diagram illustrating data flow between components associated with the data integration system 122 having a pre-committer worker 402, according to example embodiments. Example embodiments have the ability to pre-compact committables in the queue. As discussed above, there can only be one commit task running on a given topic. If the corresponding table has a lot of files, committing updates (e.g., creating delete files) may take longer, which results in a queue of input tasks for the given topic growing. In these cases, the committer scheduler 302 can provide a task to the pre-committer worker 402 to perform a pre-commit merge operation on the materializer committables (so long as the materializer committables represent a contiguous series of updates to the table). Specifically, the pre-committer worker 402 can take two or more materializer committables as input and produce fewer, new materializer committables as output. Thus, the pre-committer worker 402 rewrites not-yet-committed files into one or more larger files. For example, given the materializer committables {5:8}, {9:12}, {13:16}, and {17:20}, the committer scheduler 302 can schedule a pre-commit task to merge these materializer committables and send the pre-commit task to the pre-committer worker 402. In response, the pre-committer worker 402 rewrites these materializer committables into a new materializer committable {5:20}.

The use of pre-commit merge is useful in several ways. First, pre-commit merge reduces updates for a same key in data files (e.g., used to identify records that have been updated multiple time within the materializer committables). In example embodiments, the committables point to data files that contain records and these records have a (primary) key. If there are three input materializer committables, each setting a value for the same key, then the pre-commit merge can result in an output materializer committable containing the latest value for that key. For instance, assume the input committables are: Committable 1: {key: "user123", value: "login", offset: 5}; Committable 2: {key: "user123", value: "update profile", offset: 6}; Committable 3: {key: "user123", value: "logout", offset: 7}. Then the pre-commit merge operation (e.g., the pre-committer work 402) identifies that all three committables pertain to the same key ("user123"). The pre-committer work 402 squashes the updates, retaining only the latest value for "user123" (e.g., "logout"). That is, the pre-commit operation rewrites the three not-yet-committed committables referring to data files containing the primary key "user123" into a single data file containing the latest value. As such, the output committable will be Committable: {key: "user123", value: "logout", offset: 7}.

As another example, assume the following series of updates to a table: 1) add rows 5, 6, and 7; 2) update row 7 and add row 8; 3) delete row 5 and add row 9. These can be merged together into one new materializer committable that just contains row 6, the updated row 7, and rows 8 and 9. Thus, the result is fewer and bigger materializer committables which speeds up the commit process and can improve read performance.

Figure 5:
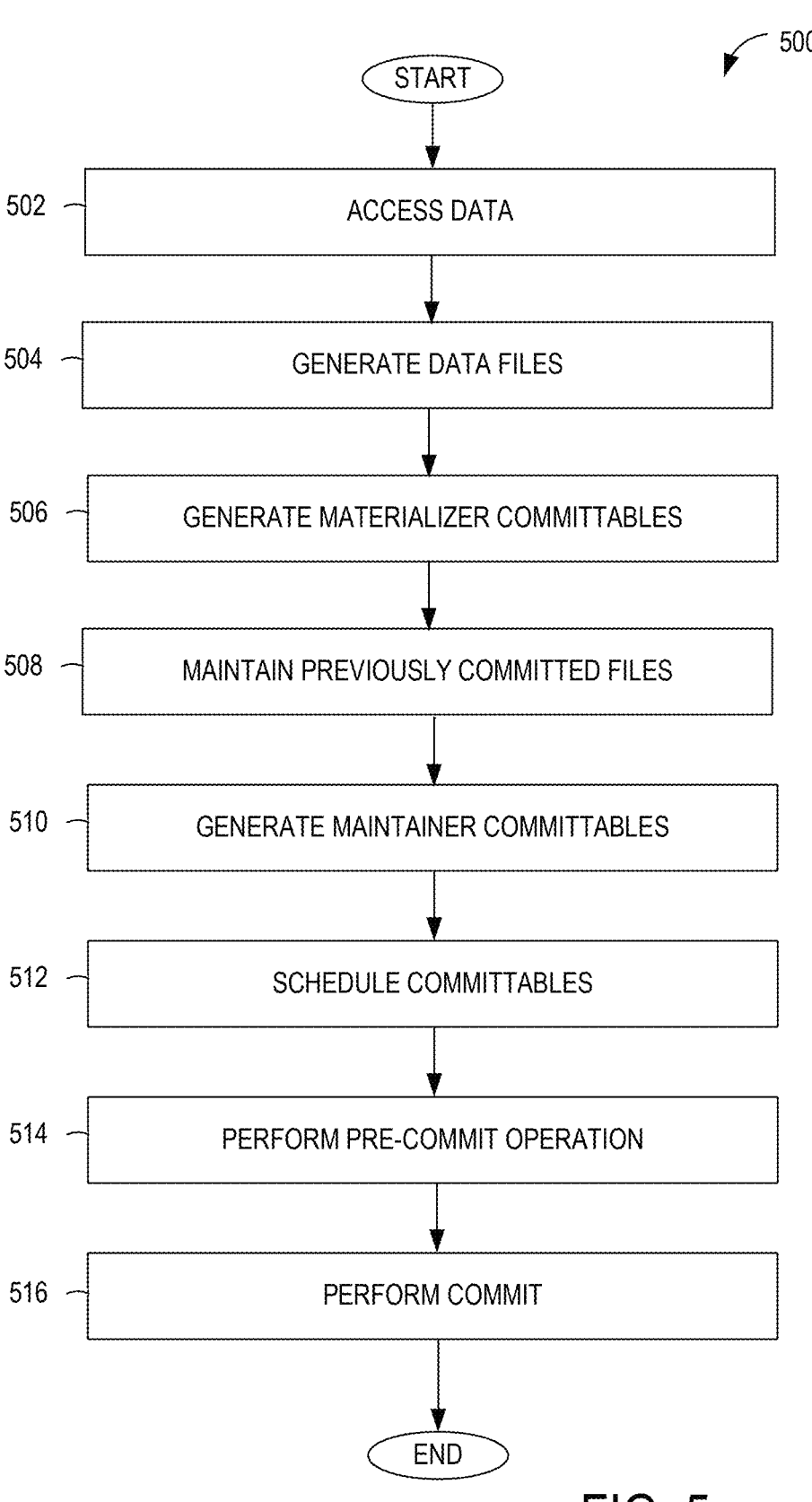
FIG. 5 is a flowchart of a method for transforming data into a distributed table format, according to example embodiments.

FIG. 5 is a flowchart of a method 500 for transforming data into a distributed table format, according to example embodiments. Operations in the method 500 may be performed by the components in the network environment described above with respect to FIG. 1-FIG. 4. Accordingly, the method 500 is described by way of example with reference to components in the network environment. However, it shall be appreciated that at least some of the operations of the method 500 may be deployed on various other hardware configurations or be performed by similar components. Therefore, the method 500 is not intended to be limited to these components.

In operation 502, the real-time streaming platform 102 accesses new data for a topic. Initially, the new data is generated and stored in partitions of the topic at the client system 106. The data component 110 of the real-time streaming platform 102 accesses the new data in the topics 112 in substantially real-time and provides it to the storage layer 120. In example embodiments, the partitions and topics in the storage layer 120 mirror the partitions and topics 112 in the client system 106.

In operation 504, the materializers 204 generate data files based on the new data. Specifically, each materializer 204 read records from a specific range of offsets within a partition of the topic. Each materializer 204 then writes them into storage or data files. In example embodiments, the data files comprise columnar data files, such as, for example, Parquet™ files. As an example, a first materializer1 204A can process offsets 1-4 from a partition 1, while a second materializer 204B can process offsets 5-8 from the same partition 1.

In operation 506, the materializers 204 generate materializer committables. In example embodiments, each materializer 204 generates a corresponding committable for the records from their respective range of offsets. Continuing with the example, the first materializer1 204A can generate a committable {1,4}, while the second materializer 204B can generate a committable {5,8}.

In operation 508, the data integration system 122 performs maintenance on previously committed files. In example embodiments, the maintainer 206 periodically scans the storage layer (e.g., the data/delete files 216) to identify small or obsolete data files that need to be compacted or removed. Accordingly, the maintainer 206 can merge smaller files into larger ones. For example, the maintainer 206 can merge three small files (D1, D2, D3) into a single larger file (D4). The maintainer 206 can also delete the obsolete data files and/or delete snapshots that are no longer needed.

In operation 510, the maintainer 206 generates a maintainer committable for each new file that it generates or deletion performed. For example, after the maintainer 206 merges the three small files (D1, D2, D3) into the single larger file (D4), the maintainer 206 generates a maintainer committable {−D1, D2, D3 +D4}.

In operation 512, the committer 202 schedules the maintainer and materializer committables for processing. In example embodiments, the committer schedule 302 or the committer 202 receives all the committables and schedules them for processing based on various rules and heuristics. Operation 512 will be discussed in more detail in connection with FIG. 6 below.

In operation 514, the committer 202 performs a pre-commit merge operation. In embodiments where the queue of input tasks for a given topic grows, the committer 202 (e.g., the pre-committer worker 402) performs the pre-commit merge operation. The pre-commit merge operation comprises accepting multiple, contiguous materializer committables as input and generating fewer/larger materializer committables as output. For example, given materializer committables for a partition of {1, 4}, {5, 8}, and {9, 12}, the pre-commit merge operation combines them into a single committable {1, 12}. It is noted that operation 514 is optional.

In operation 516, the committer 202 performs the commit process. In example embodiments, the committer 202 (e.g., the committer worker 304) processes the maintainer and materializer committables as scheduled by the committer scheduler 302 and generates a snapshot of the state of the table. The committer 202 also updates metadata to include references to the new data files and removes references to obsolete files to reflect the new state of the table. The updated metadata can be written to a storage system (e.g., the cloud computing platform 108) to finalize the commit process.

Figure 6:
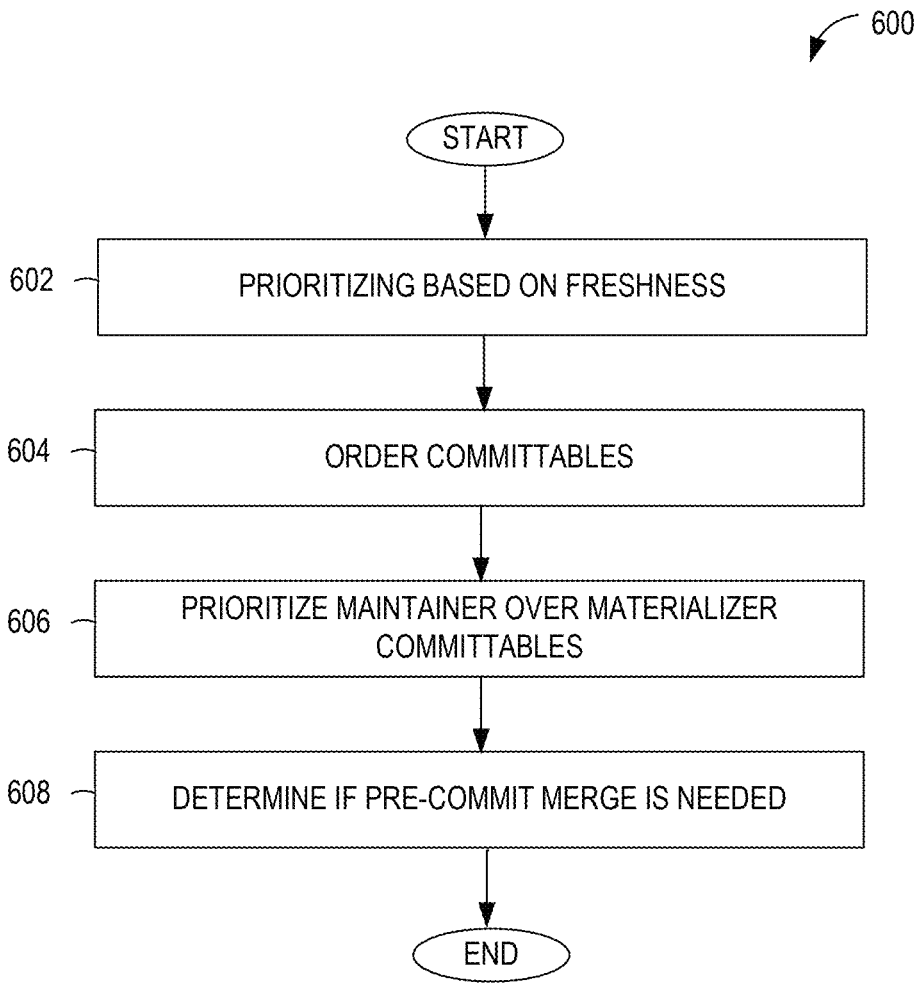
FIG. 6 is a flowchart of a method for scheduling committables for execution by a committer, according to example embodiments.

FIG. 6 is a flowchart of a method 600 (e.g., operation 512) for scheduling committables for execution by the committer 202, according to example embodiments. Operations in the method 600 may be performed by the components in the network environment described above with respect to FIG. 1-FIG. 4. Accordingly, the method 600 is described by way of example with reference to components in the network environment. However, it shall be appreciated that at least some of the operations of the method 600 may be deployed on various other hardware configurations or be performed by similar components. Therefore, the method 600 is not intended to be limited to these components.

In operation 602, the committer 202 (e.g., committer scheduler 302) prioritizes the topics/committables based on a freshness property that indicates how soon published messages should appear in the snapshot. This target freshness property is configurable by a client/customer and is typically on the lower side (e.g., with a few minutes). The committer scheduler 302 can prioritize commits to topics with exceeded (or soon to be exceeded) target freshness.

In operation 604, the committer scheduler 302 next orders materializer committables. In one embodiment, the materializer committables are ordered based on their offsets to ensure the correct sequence of events. By using offsets, the committer scheduler 302 can also ensure that there are no gaps in the offsets. In other embodiments, a different ordering mechanism can be used, such as, timestamps or a logical clock.

In operation 606, the committer scheduler 302 prioritizes maintainer committables over materializer committables. Maintainer committables typically involve merging smaller files into larger ones and removing obsolete files. By processing maintainer committables first, the committer 202 can reduce the number of files that need to be updated, minimizing the commit overhead and improving efficiency.

In operation 608, the committer 202 determines if pre-commit merges should be performed. If there are materializer committables that can be combined, the committer schedule 302 can schedule a task to combine these materializer committables into a larger committable (so long as the materializer committables represent a contiguous series of updates to the table).

Figure 7:
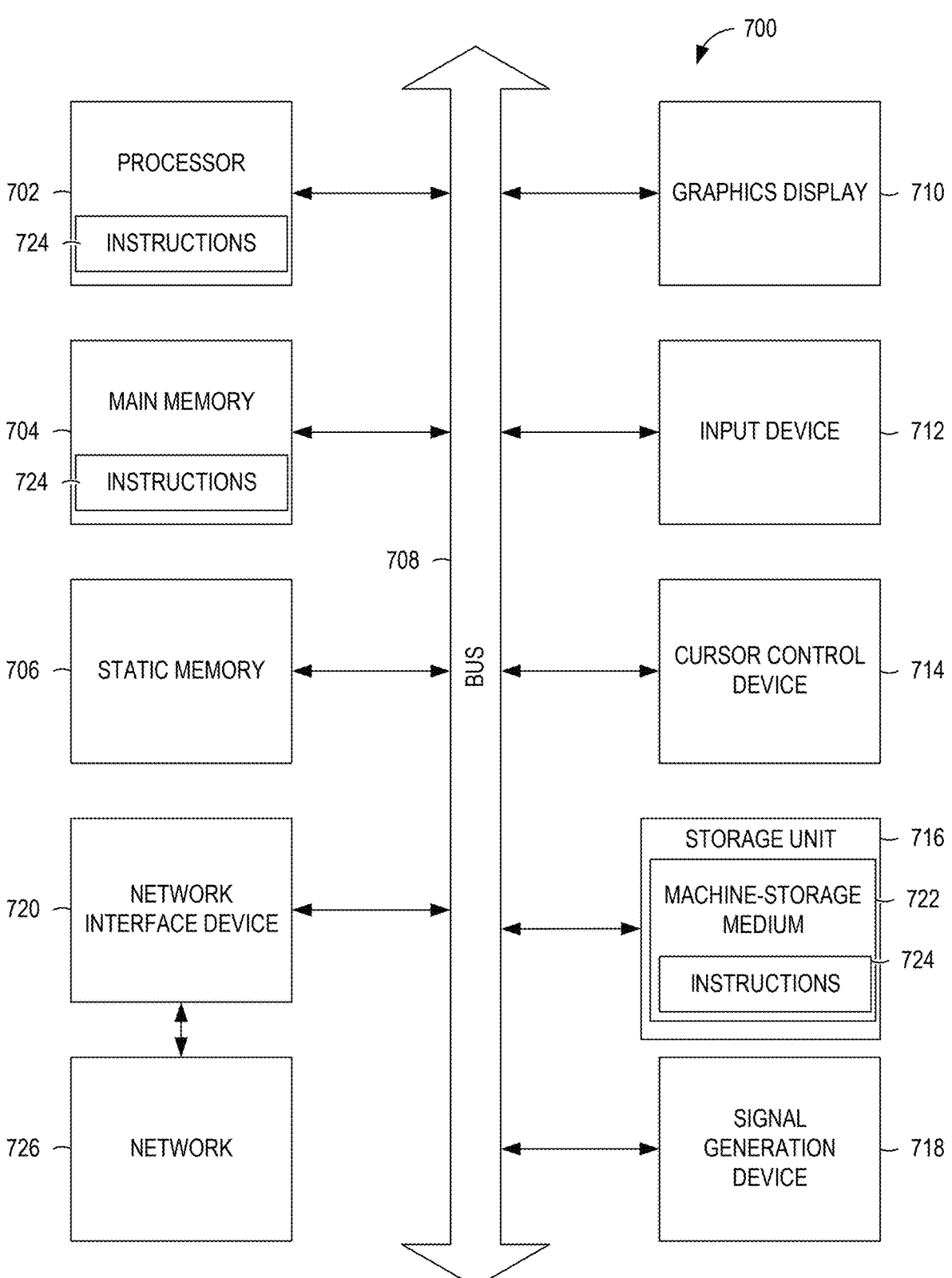
FIG. 7 is a block diagram illustrating components of a machine, according to some examples, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute some or all of the diagrams and flowcharts of FIG. 2-FIG. 6. In one embodiment, the instructions 724 can transform the machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more components described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722")

mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for transforming data into a distributed table format for a table. The method comprises accessing new data for a topic; generating, by one or more materializers, data files based on the new data; generating, by the one or more materializers, materializer committables corresponding to the data files; performing, by a maintainer, one or more maintenance operations on previously committed files; generating, by the maintainer, a maintainer committable for each maintenance operation performed; scheduling, by a committer scheduler, the maintainer and materializer committables for a commit process; and performing the commit process based on the scheduling.

In example 2, the subject matter of example 1 can optionally include wherein generating the data files comprises each of the one or more materializers processing a specific offset range within a partition of the topic.

In example 3, the subject matter of any of examples 1-2 can optionally include wherein performing the one or more maintenance operations comprises merging smaller previously committed files into a larger file or deleting obsolete previously committed files.

In example 4, the subject matter of any of examples 1-3 can optionally include performing a pre-commit merge operation that merges a plurality of contiguous materializer committables into a single materializer committable.

In example 5, the subject matter of any of examples 1-4 can optionally include performing a pre-commit merge operation that squashing updates for a same key and retains only a latest value for the key.

In example 6, the subject matter of any of examples 1-5 can optionally include wherein scheduling the maintainer and materializer committables comprises prioritizing the maintainer committable over the materializer committables.

In example 7, the subject matter of any of examples 1-6 can optionally include wherein scheduling the maintainer and materializer committables comprises ordering the materializer committables based on offsets associated with partitions of the topic.

In example 8, the subject matter of any of examples 1-7 can optionally include wherein the committer scheduler processes a subset of topics in a given cloud region and priorities topics based on configurable properties.

In example 9, the subject matter of any of examples 1-8 can optionally include wherein the configurable properties comprises a freshness property that indicates how soon published data should appear in the table.

In example 10, the subject matter of any of examples 1-9 can optionally include wherein performing commit comprises generating a snapshot of the state of the table.

In example 11, the subject matter of any of examples 1-10 can optionally include wherein the data files are Parquet™ files and the table is an Iceberg table.

Example 12 is a system for transforming data into a distributed table format for a table. The system comprises one or more processors and a memory storing instructions that, when executed by the one or more processors, cause the one or more processors to perform operations comprising accessing new data for a topic; generating data files based on the new data; generating materializer committables corresponding to the data files; performing one or more maintenance operations on previously committed files; generating a maintainer committable for each maintenance operation performed; scheduling the maintainer and materializer committables for a commit process; and performing the commit process based on the scheduling.

In example 13, the subject matter of example 12 can optionally include wherein generating the data files comprises each of one or more materializers processing a specific offset range within a partition of the topic.

In example 14, the subject matter of any of examples 12-13 can optionally include wherein performing the one or more maintenance operations comprises merging smaller previously committed files into a larger file or deleting obsolete previously committed files.

In example 15, the subject matter of any of examples 12-14 can optionally include wherein the operations further comprise performing a pre-commit merge operation that merges a plurality of contiguous materializer committables into a single materializer committable.

In example 16, the subject matter of any of examples 12-15 can optionally include wherein the operations further comprise performing a pre-commit merge operation that squashing updates for a same key and retains only a latest value for the key.

In example 17, the subject matter of any of examples 12-16 can optionally include wherein scheduling the maintainer and materializer committables comprises prioritizing the maintainer committable over the materializer committables.

In example 18, the subject matter of any of examples 12-17 can optionally include wherein scheduling the maintainer and materializer committables comprises ordering the materializer committables based on offsets associated with partitions of the topic.

In example 19, the subject matter of any of examples 12-18 can optionally include wherein the system processes a subset of topics in a given cloud region and priorities topics based on a freshness property that indicates how soon published data should appear in the table.

Example 20 is a machine-storage medium comprising instructions which, when executed by one or more processors of a machine, cause the machine to perform operations comprising accessing new data for a topic; generating data files based on the new data; generating materializer committables corresponding to the data files; performing one or more maintenance operations on previously committed files; generating a maintainer committable for each maintenance operation performed; scheduling the maintainer and materializer committables for a commit process; and performing the commit process based on the scheduling.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method for transforming data into a distributed table format for a table, the method comprising:
   accessing new data for a topic;
   generating, by one or more materializers, data files based on the new data;
   generating, by the one or more materializers, materializer committables corresponding to the data files, each materializer committable comprising a metadata object describing one or more corresponding data files;
   performing, by a maintainer, one or more maintenance operations on previously committed files;
   generating, by the maintainer, a maintainer committable for each maintenance operation performed, each maintainer committable comprising a metadata object describing the corresponding maintenance operation;
   scheduling, by a committer scheduler, the maintainer and materializer committables for a commit process; and performing the commit process based on the scheduling, the commit process committing the maintainer and materializer committables to the distributed table format.

2. The method of claim 1, wherein the generating the data files comprises processing a specific offset range within a partition of the topic.

3. The method of claim 1, wherein the performing the one or more maintenance operations comprises merging smaller previously committed files into a larger file or deleting obsolete previously committed files.

4. The method of claim 1, further comprising:
   performing a pre-commit merge operation that merges a plurality of contiguous materializer committables into a single materializer committable.

5. The method of claim 1, further comprising:
   performing a pre-commit merge operation that squashing updates for a same key and retains only a latest value for the key.

6. The method of claim 1, wherein the scheduling the maintainer and materializer committables comprises prioritizing the maintainer committables over the materializer committables.

7. The method of claim 1, wherein the scheduling the maintainer and materializer committables comprises ordering the materializer committables based on offsets associated with partitions of the topic.

8. The method of claim 1, wherein the committer scheduler processes a subset of topics in a given cloud region and priorities topics based on configurable properties.

9. The method of claim 8, wherein the configurable properties comprise a freshness property that indicates how soon published data should appear in the table, the committer scheduler prioritizing commits to topics with exceeded or soon to be exceeded target freshness.

10. The method of claim 1, wherein the performing the commit process comprises generating a snapshot of a state of the table.

11. The method of claim 1, wherein the data files are Parquet™ files and the table is an Iceberg™ table.

12. A system for transforming data into a distributed table format for a table, the system comprising:
   one or more hardware processors; and
   a memory storing instructions that, when executed by the one or more hardware processors, cause the one or more hardware processors to perform operations comprising:
   accessing new data for a topic;
   generating data files based on the new data;
   generating materializer committables corresponding to the data files, each materializer committable comprising a metadata object describing one or more corresponding data files;
   performing one or more maintenance operations on previously committed files;
   generating a maintainer committable for each maintenance operation performed, each maintainer committable comprising a metadata object describing the corresponding maintenance operation;
   scheduling the maintainer and materializer committables for a commit process; and
   performing the commit process based on the scheduling, the commit process committing the maintainer and materializer committables to the distributed table format.

13. The system of claim 12, wherein the generating the data files comprises processing a specific offset range within a partition of the topic.

14. The system of claim 12, wherein the performing the one or more maintenance operations comprises merging smaller previously committed files into a larger file or deleting obsolete previously committed files.

15. The system of claim 12, wherein the operations further comprise:

performing a pre-commit merge operation that merges a plurality of contiguous materializer committables into a single materializer committable.

16. The system of claim 12, wherein the operations further comprise:

performing a pre-commit merge operation that squashing updates for a same key and retains only a latest value for the key.

17. The system of claim 12, wherein the scheduling the maintainer and materializer committables comprises prioritizing the maintainer committables over the materializer committables.

18. The system of claim 12, wherein the scheduling the maintainer and materializer committables comprises ordering the materializer committables based on offsets associated with partitions of the topic.

19. The system of claim 12, wherein the system processes a subset of topics in a given cloud region and priorities topics based on a freshness property that indicates how soon published data should appear in the table.

20. A machine-storage medium comprising instructions which, when executed by one or more processors of a machine, cause the machine to perform operations for transforming data into a distributed table format for a table, the operations comprising, accessing new data for a topic;

generating data files based on the new data;

generating materializer committables corresponding to the data files, each materializer committable comprising a metadata object describing one or more corresponding data files;

performing one or more maintenance operations on previously committed files;

generating a maintainer committable for each maintenance operation performed, each maintainer committable comprising a metadata object describing the corresponding maintenance operation;

scheduling the maintainer and materializer committables for a commit process; and performing the commit process based on the scheduling, the commit process committing the maintainer and materializer committables to the distributed table format.

\* \* \* \* \*